Nov. 22, 1949     L. G. KAILER     2,489,037
PLUG FOR AUTOMOBILE TROUBLE LAMP
Filed March 22, 1946     2 Sheets-Sheet 1
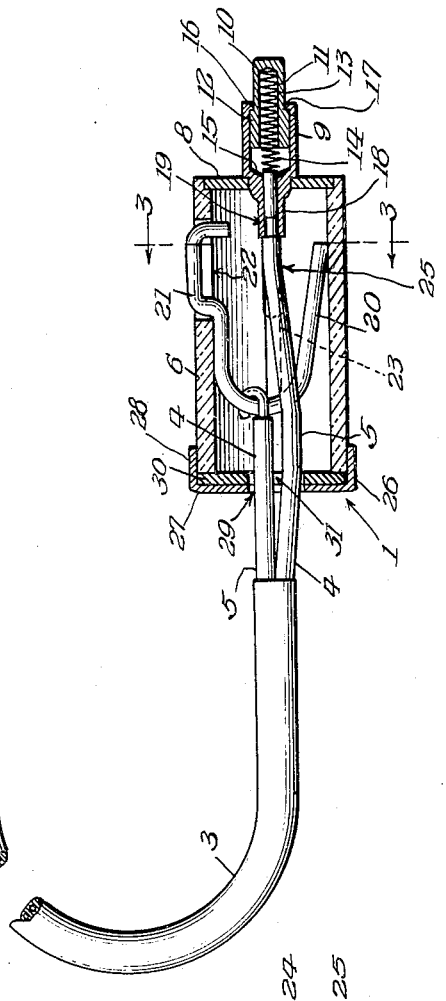
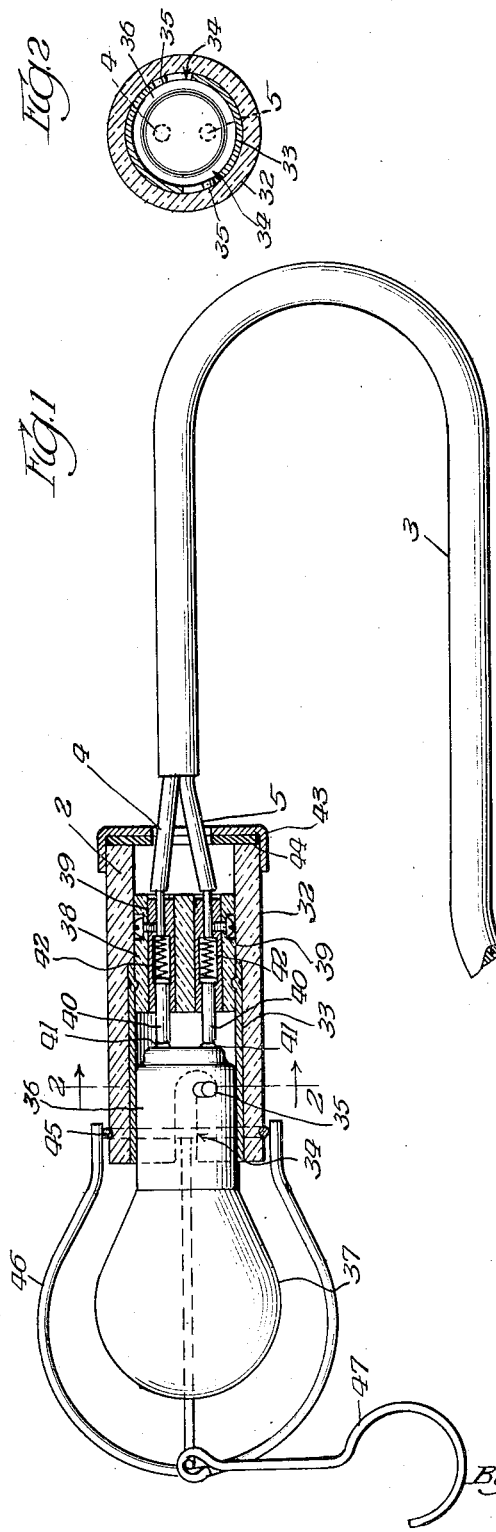
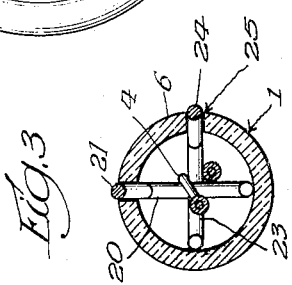
Inventor:
Louis G. Kailer,
By Spencer, Margall, Johnston & Cook
Attys Nov. 22, 1949 L. G. KAILER 2,489,037
PLUG FOR AUTOMOBILE TROUBLE LAMP
Filed March 22, 1946 2 Sheets-Sheet 2
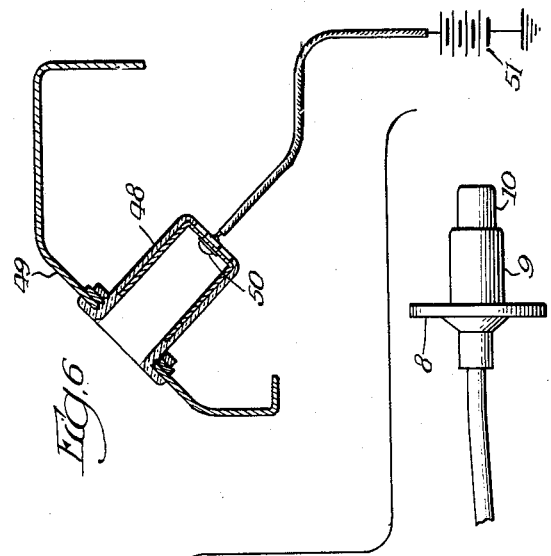
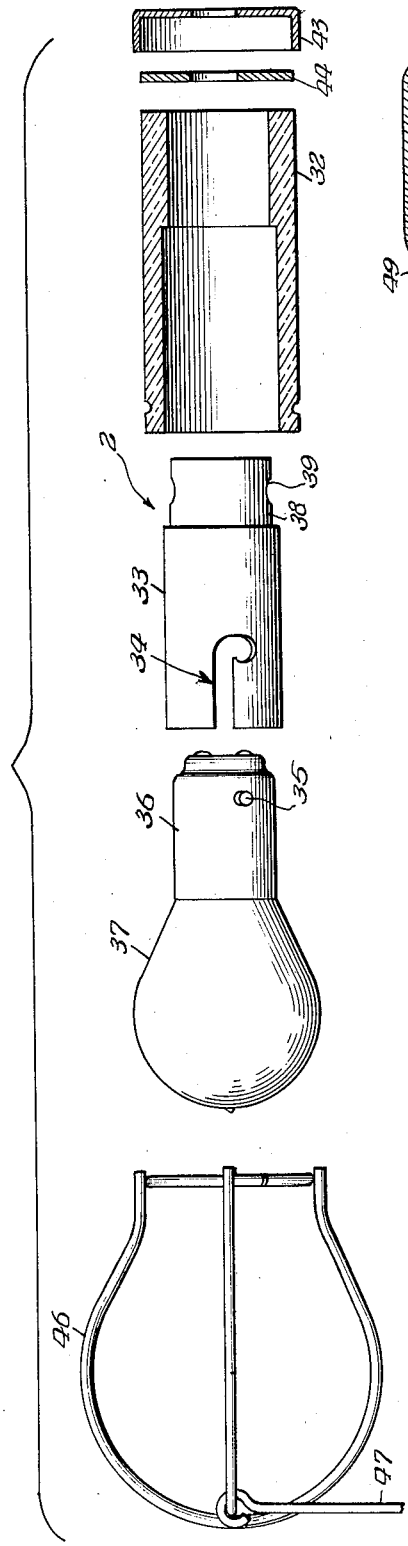
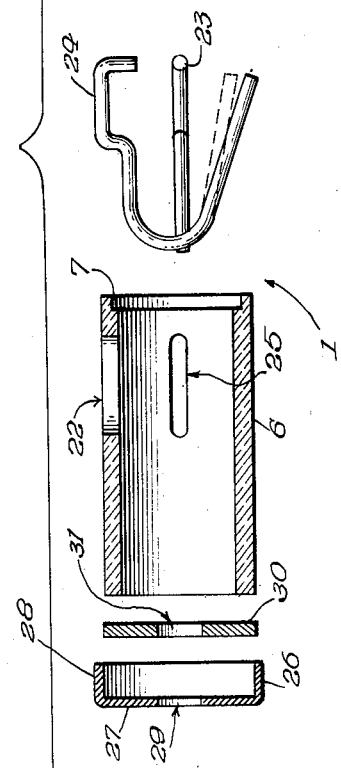
Inventor:
Louis G. Kailer,
Spencer, Marzall,
Johnston & Cook,
By Attys.

Patented Nov. 22, 1949

2,489,037

UNITED STATES PATENT OFFICE 2,489,037

PLUG FOR AUTOMOBILE TROUBLE LAMP

Louis G. Kailer, Evanston, Ill., assignor to Peerless Tool & Engineering Co., Chicago, Ill., a corporation of Illinois Application March 22, 1946, Serial No. 656,355

3 Claims. (Cl. 173—361)

This invention relates to an extension lamp embodying an extension cord, a socket to receive a lamp being electrically connected to one end of the extension cord and a plug being electrically connected to the other end of the extension cord. The plug is of the type wherein electric contact is made with the cigar lighter socket on an automobile dashboard. Devices of a similar character are disclosed and claimed in applicant's co-pending applications Serial Nos. 618,369; 618,370; 618,371, each filed September 24, 1945, and each of which has become abandoned.

The primary object of the present invention is the provision of a new and improved extension cord or utility light embodying novel characteristics and elements whereby the plug is adapted to fit in practically every known cigar lighter socket; also the socket is so constructed and arranged that it will make positive and definite electrical contact with the lamp globe, the socket embodying a novel arrangement of parts arranged in a particular manner and constructed to provide sure and definite electrical contact.

Another important object of the invention is the provision of a utility light or extension cord embodying novel devices of construction whereby the plug is securely but removably locked in the cigar lighter socket so that proper and positive electric contact is made and the plug is maintained in the socket by frictional engagement.

A still further object of the invention resides in the novel construction and arrangement of the parts as well as the manner in which the parts are secured together and assembled in proper positive operating relationship.

Numerous other objects and advantages will be apparent throughout the progress of the specification which follows.

The accompanying drawings illustrate a selected embodiment of the invention and the views therein are as follows:

Fig. 1 is a detail sectional view of the improved extension cord or utility lamp construction;

Fig. 2 is a transverse sectional view on the line 2—2 of Fig. 1;

Fig. 3 is a detail transverse sectional view on the line 3—3 of Fig. 1;

Fig. 4 is a detail exploded view showing various parts of the lamp socket including the lamp and the lamp guard;

Fig. 5 is a detail exploded view of the plug and shows the manner in which the electric conductors are electrically connected to the plug; and Fig. 6 is a detail sectional view of a cigar lighter socket mounted on an automobile dashboard.

The particular extension light or utility lamp herein shown for the purpose of illustrating the invention comprises a plug 1 which is adapted to be removably inserted in the electric receptacle or socket of a cigar lighter, the cigar lighter element being first removed to provide access to the socket on the dashboard of an automobile. The plug 1 is connected to a socket element 2 by means of a cable 3 carrying conductors 4 and 5.

The plug 1 comprises a tubular body 6 which may be made of insulating material such as fiber, plastic or the like. The tubular body 6 is recessed as indicated at 7, Fig. 5, to receive a closure plate 8 in the form of a flat disc. The closure plate or disc 8 is provided with a concentric opening therein and receives a plug or fitting member 9.

The plug or fitting member is hollow, as clearly shown in Fig. 1, and receives a plunger element 10. The plunger has a forward extending end 11 which is of less diameter than the inner part 12 thereof. The plunger 10 is bored, as indicated at 13, to receive a coil spring 14. The coil spring 14 engages one end of the plunger 10 and the inner end 15 of the plug or fitting 9 so as to urge the plunger 10 outwardly a predetermined distance. The plunger 10 cannot be forced out of its recess or cavity in the member 9 because the end of the member 9 is turned or peened inwardly, as indicated at 16, and normally engages the shoulder 17 formed by the two diameters of the plunger member 10. The member 9 extends through the end member or disc 8, as clearly shown in Fig. 1, and terminates in a neck 18 having a hollow bore 19 provided therein. One of the conductors 4 or 5 is connected to the member 9; Fig. 1 showing the conductor 4 being electrically connected to the member or fitting 9. The member or fitting 9 may be secured in any desirable manner to the end closure or disc 8, but in actual practice it has been found that a tight pressed fit holds the parts in position securely.

The conductor 5 is electrically connected to a resilient or springy friction member 20 which is arranged inside of the hollow body 6. This springy member 20 is spread apart so that it engages and presses against opposite sides of the inside wall of the body 6. One side of the springy member 20 is provided with a projecting longitudinal part 21 which extends through a lengthwise slot or opening 22 formed in the tubular body 6 intermediate the ends thereof. The part 21 extends a sufficient distance through the slot 22 so that it will make frictional locking contact with the socket of a cigar lighter so as to hold the plug 1 in position in the socket and at the same time make electrical contact with the socket. In some instances one contractible springy member 20 is insufficient to lock securely the plug 1 in the cigar lighter socket, so it has been found desirable to provide a second springy member 23 substantially like the first mentioned springy member 20. This second springy member 23 has a longitudinal extending portion member 24 which is adapted to extend through the slot 25 formed in the body 6 and circumferentially spaced from slot 22. The springy members 20 and 23 are preferably positioned substantially ninety degrees apart as clearly shown in Figs. 3 and 5. The conductor 5 is electrically secured to one of the springy members, the drawing showing the conductor being secured to the springy member 20, Fig. 1. The conductor 5 is electrically connected in any desired manner such as by soldering the same, or by merely twisting the conductor about a part of the body 20.

As clearly shown in Figs. 2 and 3 of the drawings, the end portion 21 of one of the widely spaced legs of the U-shaped springy member 20 is given a U-shape to provide an offset contact portion. The other end portion of spring member 20 is positioned directly opposite the lateral opening or slot 22.

The inner end of the plug 1 is closed by means of an end cap 26. This end cap 26 is in the form of a ferrule and comprises a disc-like end closure part 27 having secured thereto an angular flange 28, Fig. 5. An elongated opening 29 is formed in the end of the member 26 to permit the passage of the cable 3 therethrough. This end cap 26 is adapted to have a press fit about the outside of the body as clearly shown in Fig. 1. An insulating washer 30 may be interposed between the end of the body 6 and the inside of the closure cap 26. The washer 30 has an opening 31 in alignment with the opening 29 in the cap to permit the cable 3 to pass into the interior of the tubular body 6.

The utility light socket member 2 comprises a hollow tubular body 32 which may be made of any dielectric material such as fiber, Bakelite or other plastic. This tubular body 32, Figs. 1 and 4, carries a shell 33 which is provided with opposed bayonet slots 34 to receive the projecting pins 35 on the base 36 of an electric lamp 37.

The shell 33 also carries a plug member 38 made of insulating material. The plug 38 is secured to the shell 33, and this plug carries a pair of sleeve members 39, 39. Each sleeve 39 is hollow at one end to receive one end of a conductor. The other end of each sleeve 39 carries a plunger 40 which is adapted to make electric contact with the contact members 41, 41 on the base of the lamp 37. A spring 42 is interposed in each sleeve 39 so as to urge the plunger 40 outwardly against the contacts 41 and thereby insure proper electric contact from the conductors 4 and 5 to the lamp contacts 41, 41.

The inner end of the tubular casing which provides a handle for the device, is adapted to be inclosed by an end closure cap 43. The end closure cap 43 is substantially like the end closure cap 26 for the plug 1. A washer 44, substantially like the washer 30 is interposed between the end of the tubular body 6 and the end of cap 43.

The body 32 may also be provided with an annular groove near its outer end to receive a collar 45 of a lamp guard 46.

A hook 47 may be operatively secured to the lamp guard 46 so that the lamp may be hung or otherwise suspended, if desired.

The plug is adapted to be inserted in a socket 48 mounted on the dashboard 49 of an automobile. This socket 48 is electrically connected to a part of the automobile frame, there being a contact 50 with which the plunger 10 of the plug is adapted to make electric contact. The contact member 50 is operatively and electrically connected to a battery 51 of the automobile as clearly shown in Fig. 6.

The invention provides an exceedingly efficient operating extension lamp which is adapted to be electrically connected to the cigar lighter socket of an automobile after the electric heater element of the cigar lighter device has been removed from its cooperating socket. The heater element of the cigar lighter is shown removed from Fig. 6 because the heater element per se does not comprise a part of the invention; moreover, the manner in which the cigar lighter heater element is arranged in the socket is clearly disclosed in the aforesaid co-pending applications. The device constituting the invention may be manufactured readily and economically, is neat and ornamental in appearance, is efficient in operation and may be readily assembled. The device has numerous applications in that it provides an extension cord which will assume very little space and may be carried in the glove compartment on the automobile dashboard. Moreover, the device may be used in emergencies for repair work to tires, motor or other parts of the automobile. It may also be used interiorly in the car for examining road maps at night and for other purposes.

Changes may be made in the form, construction and arrangement of the parts without departing from the spirit of the invention or sacrificing any of its advantages and the right is hereby reserved to make all such changes as fairly fall in the scope of the appended claims.

The invention is hereby claimed as follows:

1. In an automobile trouble lamp and extension cord, a connector plug adapted to be received in a cigar lighter socket of an automobile and to make electrical contact therewith, said plug comprsing a hollow tubular body of insulating material having an end portion closing one end thereof and formed with an opening for insertion of a pair of conductors, said tubular body having also a lateral opening extending lengthwise thereof intermediate its ends; means closing the other end of said tubular body and including an outwardly projecting, spring-pressed contact plunger; and a resilient contact and plug-retaining element disposed in the tubular body, said resilient element comprising a metallic spring strip having a generally U-shaped configuration with widely spaced legs pressed against opposed inner surfaces of the tubular body, one of said legs having an offset end portion normally projecting outwardly through said lateral opening and aligned therewith for yielding inward movement when the connector plug is inserted in a cigar lighter socket.

2. An electrical connector plug comprising a hollow tubular body of insulating material adapted to fit loosely in a tubular socket and to make electrical contact therewith, said body having a lateral opening extending lengthwise thereof intermediate its ends; means including an outwardly exposed central contact closing one end of the tubular body, the other end being formed with an opening for insertion of a pair of conductors; and a resilient contact and plug-retaining element disposed in said tubular body, said resilient element comprising a metallic spring strip having a U-shaped configuration with widely spaced legs pressed against opposed inner surfaces of said tubular body, the end portion of one of said legs being of U-shape and normally projecting beyond said tubular body, said U-shaped end portion being formed and arranged for contracting movement within said lateral opening as the connector plug is inserted in a tubular socket, and the end portion of the other leg of the spring strip engaging the tubular body at a position directly opposite the said lateral opening.

3. In an automobile trouble lamp, an extension cord, a connector plug adapted to be received in a cigar lighter socket of an automobile and to make electrical contact therewith, said plug comprising a hollow tubular body of insulating material having an end portion closing one end thereof and formed with an opening for insertion of a pair of conductors, said tubular body having also a plurality of circumferentially spaced lateral openings extending lengthwise thereof intermediate its ends; means closing the other end of said tubular body and including an outwardly projecting, spring-pressed contact plunger; and a plurality of resilient contact and plug-retaining elements disposed in the tubular body, each of said resilient elements comprising a metallic spring strip having a generally U-shaped configuration with widely spaced legs pressed against opposed inner surfaces of the tubular body, the end portion of one leg of each of said resilient elements engaging the inner surface of the tubular body at a point directly opposite one of said lateral openings, and each of said resilient elements having the end portion of its other leg offset and normally projecting outwardly through the corresponding one of said lateral openings and formed and arranged for contracting movement within the respective lateral openings when the connector plug is inserted in a cigar lighter socket.

LOUIS G. KAILER.

REFERENCES CITED

The following references are of record in the file of this patent:

UNITED STATES PATENTS

| Number | Name | Date |
| --- | --- | --- |
| 1,632,112 | Bramming | June 14, 1927 |
| 1,834,821 | Boatman | Dec. 1, 1931 |
| 2,236,435 | Lockshin | Mar. 25, 1941 |

FOREIGN PATENTS

| Number | Country | Date |
| --- | --- | --- |
| 128,833 | Switzerland | Nov. 16, 1932 |
| 132,126 | Switzerland | June 1, 1929 |
| 144,573 | Austria | Feb. 10, 1936 |
| 328,908 | Germany | Apr. 12, 1921 |
| 425,752 | Germany | Feb. 27, 1926 |
| 452,238 | France | Mar. 3, 1913 |